United States Patent
Metzgen

(10) Patent No.: US 7,581,088 B1
(45) Date of Patent: Aug. 25, 2009

(54) CONDITIONAL EXECUTION USING AN EFFICIENT PROCESSOR FLAG

(75) Inventor: Paul Metzgen, Chiswick (GB)

(73) Assignee: Altera Corporation, San Jose, CA (US)

( * ) Notice: Subject to any disclaimer, the term of this patent is extended or adjusted under 35 U.S.C. 154(b) by 191 days.

(21) Appl. No.: 10/870,810

(22) Filed: Jun. 16, 2004

Related U.S. Application Data

(60) Provisional application No. 60/533,742, filed on Dec. 30, 2003.

(51) Int. Cl.
 *G06F 15/00* (2006.01)
 *G06F 7/38* (2006.01)
 *G06F 9/00* (2006.01)
 *G06F 9/44* (2006.01)

(52) U.S. Cl. .................................... 712/234
(58) Field of Classification Search ................ 712/226, 712/234
See application file for complete search history.

(56) References Cited

U.S. PATENT DOCUMENTS 6,009,512 A * 12/1999 Christie ..................... 712/226
6,157,996 A * 12/2000 Christie et al. .............. 712/218
6,928,645 B2 * 8/2005 Wang et al. ................. 718/102
2003/0061471 A1 * 3/2003 Matsuo ....................... 712/226

OTHER PUBLICATIONS

80×86 instruction set found at http://www.penguin.cz/~literak/intel/intel.html.*
Cheung et al., "Predicated Instructions for Code Compaction", Department of Computer Science.

* cited by examiner

*Primary Examiner*—Eddie P Chan
*Assistant Examiner*—Brian P Johnson
(74) *Attorney, Agent, or Firm*—Weaver Austin Villeneuve & Sampson LLP

(57) ABSTRACT

Methods and apparatus are provided for optimizing a conditional execution on a processor core. A processor sets a flag based on both the result and the type of an instruction. The flag is used during evaluation of a subsequent instruction to determine if the subsequent instruction should be executed. A semantically overloaded flag can be used to efficiently handle chained logical comparisons.

23 Claims, 9 Drawing Sheets

| Meaning 105 | Condition Flag State 101 | Condition 103 | | | |
|---|---|---|---|---|---|
| Always (unconditional) | | 0 | 0 | 0 | 0 |
| Equal | Z set | 0 | 0 | 0 | 1 |
| Not Equal | Z clear | 0 | 0 | 1 | 0 |
| Carry set | C set | 0 | 0 | 1 | 1 |
| Carry clear | C clear | 0 | 1 | 0 | 0 |
| Minus/negative | N set | 0 | 1 | 0 | 1 |
| Plus/positive or zero | N clear | 0 | 1 | 1 | 0 |
| Overflow | V set | 0 | 1 | 1 | 1 |
| No overflow | V clear | 1 | 0 | 0 | 0 |
| Unsigned higher | C set and Z clear | 1 | 0 | 0 | 1 |
| Unsigned lower or same | C clear and Z set | 1 | 0 | 1 | 0 |
| Signed greater than or equal | N set and V set or N clear and V clear | 1 | 0 | 1 | 1 |
| Signed less than | N set and V clear or N clear and V set | 1 | 1 | 0 | 0 |
| Signed greater than | Z clear, and either N set and V set, or N clear and V clear | 1 | 1 | 0 | 1 |
| Signed less than or equal | Z clear, and either N set and V clear, or N clear and V set | 1 | 1 | 1 | 0 |

| Meaning 105 | Condition Flag State 101 | Condition 103 | | | |
|---|---|---|---|---|---|
| Always (unconditional) | | 0 | 0 | 0 | 0 |
| Equal | Z set | 0 | 0 | 0 | 1 |
| Not Equal | Z clear | 0 | 0 | 1 | 0 |
| Carry set | C set | 0 | 0 | 1 | 1 |
| Carry clear | C clear | 0 | 1 | 0 | 0 |
| Minus/negative | N set | 0 | 1 | 0 | 1 |
| Plus/positive or zero | N clear | 0 | 1 | 1 | 0 |
| Overflow | V set | 0 | 1 | 1 | 1 |
| No overflow | V clear | 1 | 0 | 0 | 0 |
| Unsigned higher | C set and Z clear | 1 | 0 | 0 | 1 |
| Unsigned lower or same | C clear and Z set | 1 | 0 | 1 | 0 |
| Signed greater than or equal | N set and V set or N clear and V clear | 1 | 0 | 1 | 1 |
| Signed less than | N set and V clear or N clear and V set | 1 | 1 | 0 | 0 |
| Signed greater than | Z clear, and either N set and V set, or N clear and V clear | 1 | 1 | 0 | 1 |
| Signed less than or equal | Z clear, and either N set and V clear, or N clear and V set | 1 | 1 | 1 | 0 |

Figure 1

| Specified Conditional Register 203 | creg 201 | | | z |
|---|---|---|---|---|
| | 31 Bit | 30 Bit | 29 Bit | 28 Bit |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| Reserved | 1 | 1 | x | x |

Figure 2

| X | | Condition |
|---|---|---|
| Execute Unconditionally 303 | 1 | 1 |
| Execute if F = true 305 | 0 | 1 |
| Execute if F = false 307 | 1 | 0 |

Figure 3

| Opcode 401 | Parameter 403 | Parameter 405 | Execution code 407 |

Figure 4

CONDITIONAL EXECUTION USING AN EFFICIENT PROCESSOR FLAG

CROSS REFERENCE TO RELATED APPLICATIONS

This application claims benefit of priority under 35 U.S.C. 119(e) of (i) U.S. Provisional Application No. 60/533,742 filed Dec. 30, 2003 and titled "CONDITIONAL EXECUTATION USING A PROCESSOR FLAG", the entirety of which is incorporated by reference for all purposes.

BACKGROUND OF THE INVENTION

1. Field of the Invention

The present invention relates to implementing a processor core that allows for conditional execution using a processor flag. In one example, the present invention relates to methods and apparatus for efficiently implementing a single overloaded flag that does not require additional register-memory bandwidth.

2. Description of Related Art

Conventional processors support a variety of instructions sets. The instruction sets include mechanisms for handling conditional execution. Conditional execution allows a processor to determine whether to execute a particular instruction or instruction sequence based on the result or modification of a prior instruction. Assembly language support for conditional execution includes branch instructions and condition codes or flags. High level programming language analogues include if then statements and case statements.

Typical mechanisms for handling conditional instruction execution include the use of fixed semantic flags and comparison tests on registers values. However, there are substantial drawbacks associated with conventional conditional execution mechanisms. In some instances, extra registers or a large number of reserved bit sequences are needed to implement typical conditional execution handling.

Consequently, it is desirable to provide improved methods and apparatus for handling conditional execution.

SUMMARY OF THE INVENTION

Methods and apparatus are provided for optimizing a conditional execution on a processor core. A processor sets a flag based on both the result and the type of an instruction. The flag is used during evaluation of a subsequent instruction to determine if the subsequent instruction should be executed. A semantically overloaded flag can be used to efficiently handle chained logical comparisons.

According to various embodiments, a method for performing conditional is provided. A flag is provided to represent one or more condition codes. An instruction included in the instruction set supported by a processor is identified. The instruction includes an operation code and one or more parameters. The flag is set based on the result of the instruction and the type of instruction.

In another embodiment, a device is provided. The device includes a memory and a processor. The processor core is coupled to memory. The processor core is configured to receive an instruction included in the instruction set supported by the processor core and set a flag based on the type of the instruction and the result of the instruction. The flag is used to determine whether the processor core will execute a subsequently received instruction.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

FIG. 1 is a diagrammatic representation showing condition codes.

FIG. 2 is a diagrammatic representation showing information for register comparison tests.

FIG. 3 is a diagrammatic representation showing execution codes.

FIG. 4 is a diagrammatic representation showing an instruction supporting overloaded flags.

DETAILED DESCRIPTION OF SPECIFIC EMBODIMENTS

Figure 5:
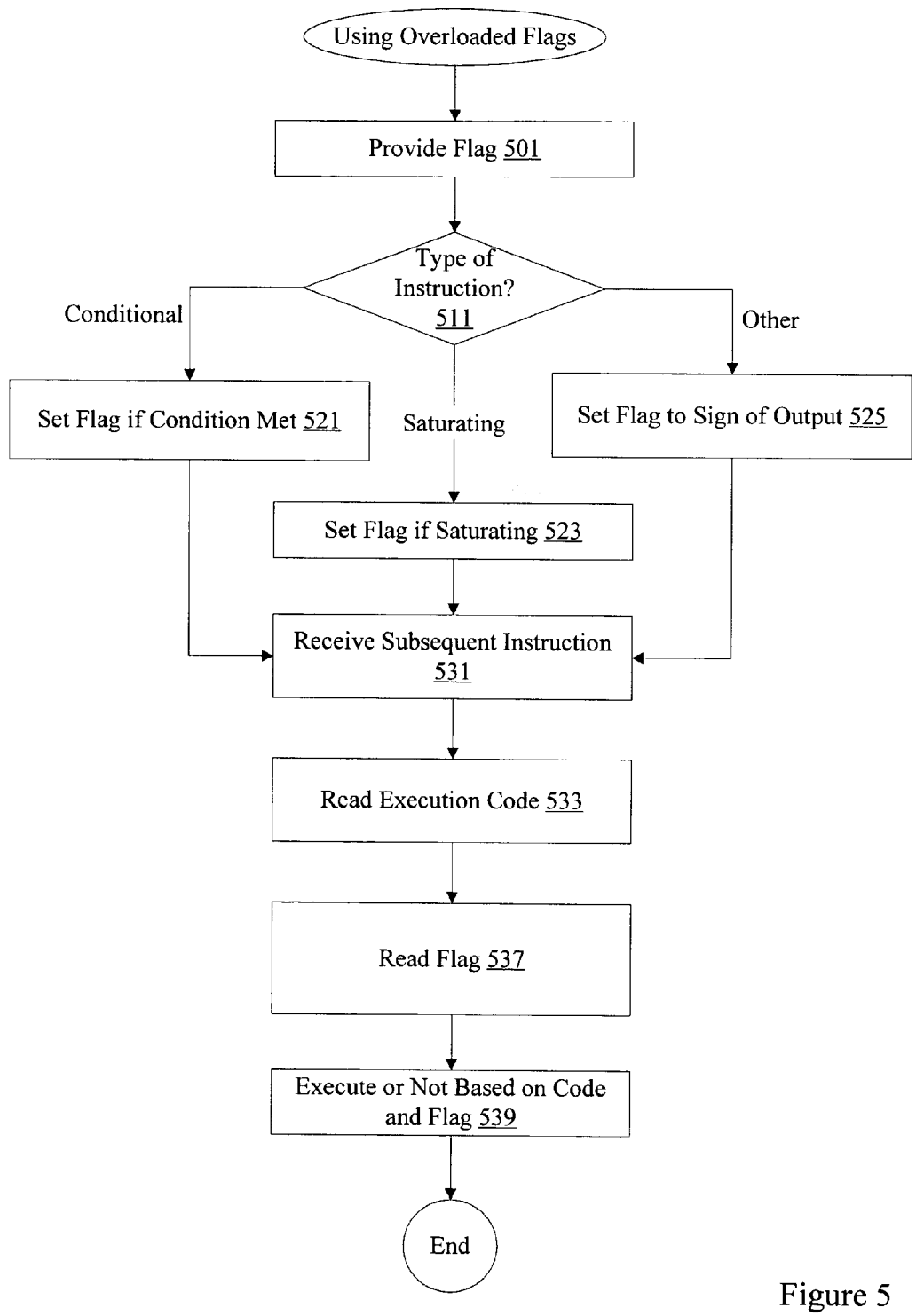
FIG. 5 is a diagrammatic representation showing a technique for using overloaded flags.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of particular processors and memory.

However, it should be noted that the techniques of the present invention can be applied to a variety of types of devices. In the following description, numerous specific details are set forth in order to provide a thorough understanding of the present invention. The present invention may be practiced without some or all of these specific details. In other instances, well known process operations have not been described in detail in order not to unnecessarily obscure the present invention. Furthermore, techniques and mechanisms of the present invention will sometimes be described in singular form for clarity. However, it should noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

For example, the techniques of the present invention will be described in the context of particular processors and instruction sets. However, it should be noted that the techniques of the present invention can be applied to a variety of different processors and instructions. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Programs implemented on processors make decisions and execute different code depending on the outcome of previous instructions. Based on the input data and the values created during computation, different instructions can be executed. Decision making is typically represented in programming languages using the "if" statement. In assembly language, decision making instructions are represented using instructions such as branch if equal (BEQ) or branch if not equal (BNE). Some branch instructions such as BEQ test if a particular value is equal to another value while a BNE instruction will branch only if a value is not equal to another value.

A typical sequence for using branch instructions is the following:

ADD % a, % a, −10
BEQ zero non-zero:
SUB % c, % a, % b
zero:
SUB % c, % b, % a end:

The instruction SUB % c, % b, % a is executed if % a is equal to zero while SUB % c, % a, % b is executed if % a is not equal to zero. Branch instructions can be computationally expensive. Branches typically take many clock cycles for processors with deep pipelines.

Conditional execution on the other hand makes use of particular flags in order to determine what code segments to execute. Conditional execution can make code faster, saving the processor from executing expensive branches. The following is on example using conditional execution:

ADD % a, % a, 1
IF [Z] SUB % c, % a, % b
SUB % c, % b, % a

If the Z flag is set, the instruction SUB % c, % a, % b is executed. If the Z flag is not set, the instruction SUB % c, % b, % a is executed. Conditional instructions take at least one clock cycle, even if the condition is false. This may lead to added clock cycles for executing particular instruction sequences. However, the execution time is deterministic. Having a deterministic execution time is advantageous particularly for digital signal processing applications that operate in a real time environment.

There are several executing methods for supporting conditional instructions. In one example, condition codes or flags are computed as a by-product of operations, and code is executed conditionally on a flag's value or combination of flag values. Processors typically use fixed semantic flags. Within each instruction, a comparison test on register values is embedded as the condition on which to decide whether to execute the instruction.

Processors conventionally use fixed semantic flags or codes to maintain information on various conditions. Examples of the conditions stored are as follows.

| Condition | Flag Mnemonic |
|---|---|
| Negative result | N |
| Zero result | Z |
| Carry out/Borrow in | C |
| Overflow/underflow/satuation | V |

The codes are usually stored in a multibit status register. Every instruction defines whether it will set, clear or leave unchanged the value in each flag. For example an ADD instruction may set all flags, whereas an XOR may set N, Z and clear C, V. Some conventional processors using semantic flags are ARM, Analog Devices ADSP21xx, Intel IA32 (Pentium), and the Motorola MC68000 processors.

Bits in the instruction are used to encode which test to apply. If the condition evaluates to TRUE, the instruction is executed. FIG. 1 is a table representation showing standard tests on the NZCV bits. Four bits are used to show condition codes 103. A condition flag state 101 shows the operation performed on any particular NZCV bit. Column 105 depicts the meaning. For example, if there is overflow for a particular instruction, the V bit associated with overflow/underflow/saturation is set. If the instruction involves a signed less than or equal operation, the Z bit associated with a zero result is cleared, and either the N bit associate with a negative result is set and the V bit associated with overflow/underflow/saturation is cleared or the N bit is cleared and the V bit is set.

Conventional processors use register values to implement conditional instructions. Conditional execution is based on the value in one of a limited set of registers. Tests are limited to algebraic comparisons on a register. In one example, the test is whether the register value does or does not equal zero. Although using registers to implement conditional instructions is effective, an extra operand (for the test) needs to be read from memory. Example processors using registers to implement conditional instructions include the Texas Instruments TMS320C6xxx.

FIG. 2 is a table representation showing registers that can be tested using conditional operations. The table includes a specified conditional register column 203 and conditional bits 201. If z is equal to 1, register equality to zero is tested. Otherwise, register not equal to zero is tested. Four bits are used to encode each condition. The conventional techniques all require the use of an additional 4 bits to encode the condition. The Texas Instruments TMS320C6xxx further requires additional register-memory bandwidth.

Consequently, the techniques and mechanisms of the present invention allow for conditional execution using a single overloaded flag having fewer instruction bits. No additional register-memory bandwidth is needed. Any indicator mechanism that is set not only based on the result of a particular instruction but also based on the type of instruction is referred to herein as a semantically overloaded flag or an overloaded flag.

According to various embodiments, a flag is a single bit, although multiple bit flags can be used. FIG. 3 is a diagrammatic representation showing bits that can be used for setting one example of a flag.

According to various embodiments, a single flag bit is used to represent one of the following condition codes:
compare instructions set the flag if the comparison is true,
saturating instructions set the flag if saturation occurred,
otherwise the flag can be set to the sign of the result.

Instructions use the single flag bit to handle a variety of condition codes. Four bits associated with NZCV are no longer needed. Consequently, the flag is not only set based on whether a comparison is true or saturation occurred, the flag is set based on the result and also the type of instruction (compare, saturating, etc.). Any indicator or mechanism used to hold state information is referred to herein as a flag. In one example, a flag is one bit. Setting a flag based not only on resulting information from an instruction but also based on the type of instruction is referred to herein as using semantic information. The type of flag set using semantic information is referred to herein as an overloaded flag.

Subsequent instructions can then access the flag along with other information to determine if the instruction should execute. Information can be included in each instruction to indicate if an instruction should execute based on the value of the flag. Any set of one or more bits used to indicate if an instruction should execute based on a flag value is referred to herein as an execution code. At 301, an instruction can execute unconditionally if an execution code is set to 1 1. According to various embodiments, execution codes are two bits included in an instruction. At 303, an instruction will execute if an execution code is set to 0 1 and a flag is set to true. At 305, an instruction will execute if an execution code is 1 0 and a flag is set to false. It should be noted that an execution code 1 1 can still be used for other purposes.

Consequently, the semantics are defined by the instruction setting the flag. Conditional execution on a single overloaded flag needs only 2 bits in an instruction set versus 4 for other flag based methods. As will be appreciated, various formats and schemas can be used to represent various flag, condition code, and execution code values. For example, setting a flag is depicted as setting the flag value to true. However, it should be noted that a system design can include setting the flag value to false or 0 when a flag is set. A wide variety of arrangements can be used.

Chained logical comparisons can be implemented using a single overloaded flag. For example, a chained logical OR is represented as the following:
if (x>y OR z<a)
r=s+t
Using an overloaded flag, the following instructions are used:
CMP.gt x, y
[!F] CMP.lt z, a
[F] ADD r, s, t For the first instruction, the flag is set if x is greater than y. If the flag is set, the second instruction is not executed and the third instruction ADD r, s, t is executed. If x is not greater than y, the flag is not set and the second instruction is executed. If the second instruction (CMP.lt z, a) is true, the instruction will set the flag F. If the flag is still not set, the ADD r, s, t is not executed. Otherwise, if either the first or second instruction sets the flag, the third instruction is executed.

Similarly, a chained logical AND can be implemented using a single overloaded flag. For example, a chained logical AND is represented as the following:
if (x>y AND z<a)
r=s+t
Using an overloaded flag, the following instructions are used:
CMP.gt x, y
[F] CMP.lt z, a
[F] ADD r, s, t If x is greater than y, F is set after the first instruction (CMP.gt x y). The second instruction (CMP.lt z, a) is then executed, and the instruction will set F if z is less than a. If both the first instruction and the second instruction set F, the third instruction (ADD r, s, t) will exeucte. However, if either the first instruction or the second instruction is not true, F is not set and the third instruction is not executed.

Processors with NZCV flags cannot chain different logical comparisons without using expensive branches as follows:
CMP x, y
B GT do_add
CMP z, a
B GE skip
do_add:
ADD r, s, t
skip:

While it is possible to use conditional CMP instructions to test for the same condition throughout (e.g. a EQ b AND c EQ d), it is not trivial to do this for a mixed sequence of conditions (e.g. a GT b AND c EQ d).

Consequently, by using a single overloaded flag, the benefits of conditional instructions are retained. Reduced instruction set bits are needed (e.g. 2 bits versus 4 for other flag-based methods). More bits are retained for the instruction itself. This allows potential more conditional instructions. No extra register read is required to perform conditional tests. By setting the flag in an instruction specific way, it is possible to create efficient chained logical comparisons without the need for expensive branches FIG. 4 is a diagrammatic representation showing one example of an instruction that can be used. The instruction includes an operation code 401. The operation code can be used to represent a variety of operations including read or write word, compare, add unsigned, etc. Parameters 403 and 405 can be used to provide input values for a particular operation. An execution code 407 is used to indicate whether the instruction should execute. The processor can use the instruction execution code along with an overloaded flag to determine if the instruction should execute. For example, the execution code 407 may indicate that the instruction should execute unconditionally. In this case, the processor executes the instruction without regard to the overloaded flag.

The execution code can indicate that the instruction should execute only if the flag it is set to true. Alternatively, the execution code can indicate that the instruction should execute only if the flag is set to false. The techniques of the present invention allow an execution code 407 to be implemented using only two bits. Conventional implementations required additional bits along with additional memory or register usage. By using fewer bits in the execution code 407, additional bits can be provided for parameter information.

For example, by providing additional bits for parameters, an instruction may be able to support three parameters for an unsigned add operation instead of two parameters for the same operation.

FIG. 5 is a flow process diagram showing one technique for handling conditional execution. At 501, a flag is provided for use in maintaining conditional information. According to various embodiments, the flag provided as a single bit used as a semantically overloaded flag. At 503, an instruction is received. According to various embodiments, and execution code associated with the received instruction and the current flag state is analyzed to determine if the instruction should be executed. If the instruction should be executed, the type of the instruction is determined at 511. It is determined that the instruction is a conditional instruction, the flag is set if the conditions met at 521. In the type of instruction is a saturating instruction, the flag is set if a saturating result occurs at 523. Otherwise, the flag is set to the sign of the output at 525. Consequently, a single flag is used to hold both semantic information and result information. At 531, the subsequent instruction is received. At 533, execution code is read. At 537, the flag is read. At 539, it is determined whether to execute the subsequent instruction based on the combined code and flag values.

Although the technique so the present invention are described with reference to FIG. 5 in a particular order. It should be noted that the techniques of the present invention can apply even with variations and the order of operations. For example, a flag may be read before and execution code associated with the received instruction is read. Similarly, the result of an instruction may be determined before the type of instruction is determined. It will be appreciated that a semantically overloaded flag can be used with a variety of techniques.

Although the techniques and mechanisms of the present invention or applicable to a variety of different processors including general purpose processors, video accelerators, cryptography accelerators, digital signal processors, microcontrollers, etc., the techniques and mechanisms of the present invention or particularly applicable to soft core processors on programmable chips and programmable chip systems. Logic is often at a premium on programmable chips, so the reduction in core sizes using the reset address line invalidate mechanism is often particularly beneficial.

Figure 6:
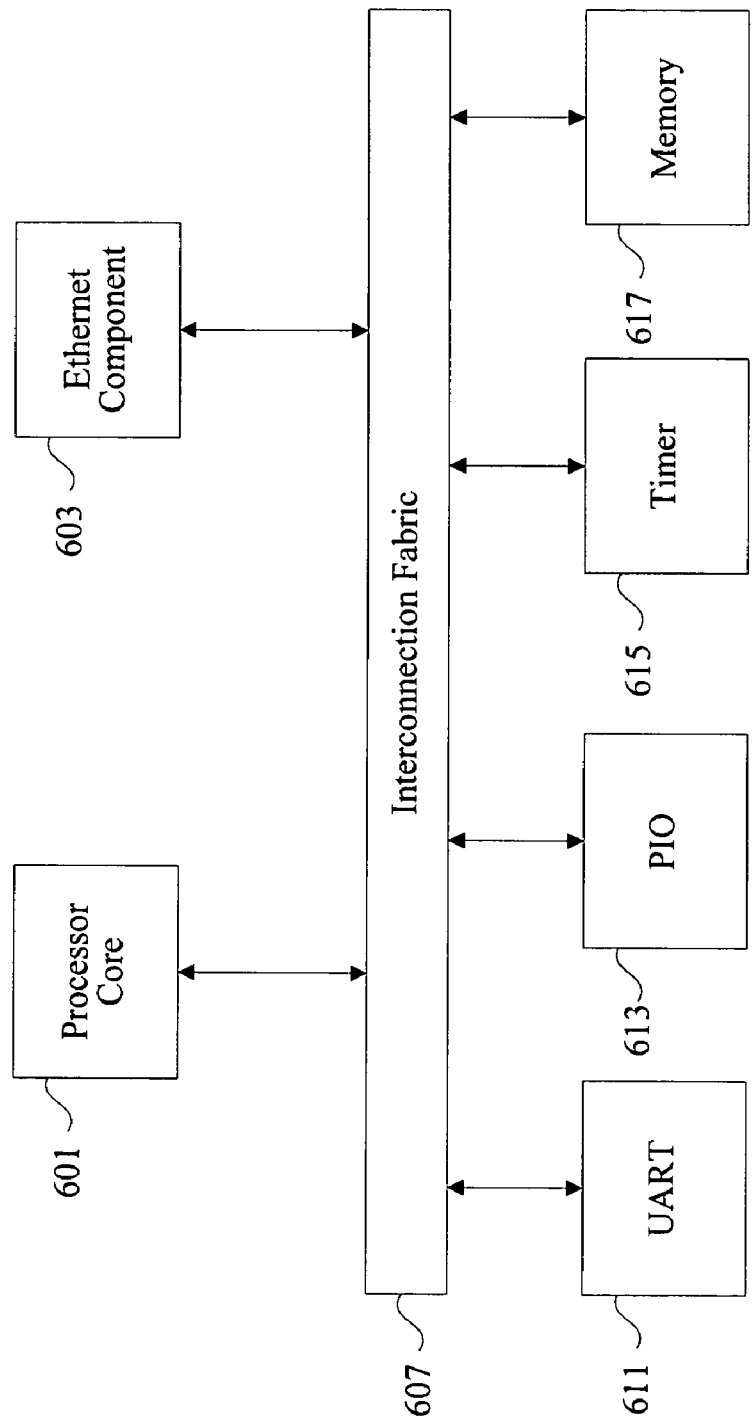
FIG. 6 is a diagrammatic representation of a programmable chip.

FIG. 6 is a diagrammatic representation showing one example of a system on a programmable chip that can be used to implement the techniques of the present invention. The system includes a processor core, a hardware accelerator, peripheral devices, and peripheral interfaces. The processor core size can be optimized by reusing subcircuitry to perform both branch and non-branch operations. Peripheral devices and peripheral interfaces are herein referred to as components. The system on a programmable chip includes processor core 601 and an Ethernet component 603 as well as peripheral components UART 611, PIO 613, timer 615, and data memory 617. In some examples, the Ethernet component 103 is instead a Digital Signal Processing (DSP) core, a cryptography accelerator, or a video processor. It should be noted that the system can include both on-chip memory 617 and off-chip memory. In one example, the data memory 617 can support variable latency or fixed latency access. The components are interconnected using an interconnection fabric 607. Any mechanism or logic for connecting components in a system is referred to herein as an interconnection fabric. In one example, the interconnection fabric is a bus. In another example, the interconnection fabric is a secondary side arbitration fabric.

The programmable chip uses different types of resources that can be interchangeably used in different allocations to implement the system on a programmable chip. In one example, the programmable chip uses logic elements for implementing each of the various components on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register.

The techniques and mechanisms of the present invention allow the implementation of a system on a programmable chip from a high-level language program. In one example, variable latency and fixed latency can be supported on a system using a conventional bus architecture.

A system bus typically has a set width (e.g. 64 bits, 128 bits) and allows only one primary component to actively use the bus at any one time. In conventional systems, only one primary component can access any one of the given secondary components at any given time. Multiple primary components accessing secondary components in a manner that would cause data bit collisions if performed on the same data lines is referred to herein as accessing secondary components at the same time.

In one example, an Ethernet component is accessing a secondary PIO. While the Ethernet component is accessing the secondary PIO, a processor can not access an SDRAM through a peripheral interface even if both the primary streaming output device and the peripheral interface are available.

According to various embodiments of the present invention, it is recognized that a bus is no longer required in certain applications such as system on a chip, system on a programmable chip, and other computer system implementations. A device such as a programmable logic device (PLD) or a field programmable gate array (FPGA) using a hardware descriptor language (HDL) is herein referred to as a programmable chip or a programmable device. Instead of implementing complicated bus sharing schemes using mechanisms such as splitting, the bus itself can be eliminated to improve system performance.

According to specific embodiments, it is recognized that primary components and secondary components need not be routed through a construct such as a bus. By not routing signals through a bus, a streaming output device can be implemented in a much more efficient manner. The conventional data and address lines that make up the bus are no longer the resource in contention. Instead, secondary components are resources in contention, as the number of physical lines connected to each secondary component in a system can be fixed. Furthermore, by not using a bus, interconnection flexibility is enhanced. For example, an Ethernet component can be allocated a variety of ports for directly accessing a memory and the only resource in contention would be the memory.

Consequently, a system bus arbitrator associated with all the secondary components in a computer system is no longer needed. Instead, secondary components themselves that may be accessed by more than one primary component are assigned individual secondary side arbitrators. An arbitrator that corresponds to a specific secondary component accessible by more than one primary component is referred to herein as a secondary side arbitrator. In one embodiment, there is a secondary side arbitrator for each secondary component in a computer system. In other embodiments, there is a secondary side arbitrator for selected secondary components in a system. The techniques of the present invention recognize that Ethernet component support for high-level language programs can be more efficiently and effectively provided in a system by using secondary side arbitration.

Figure 7:
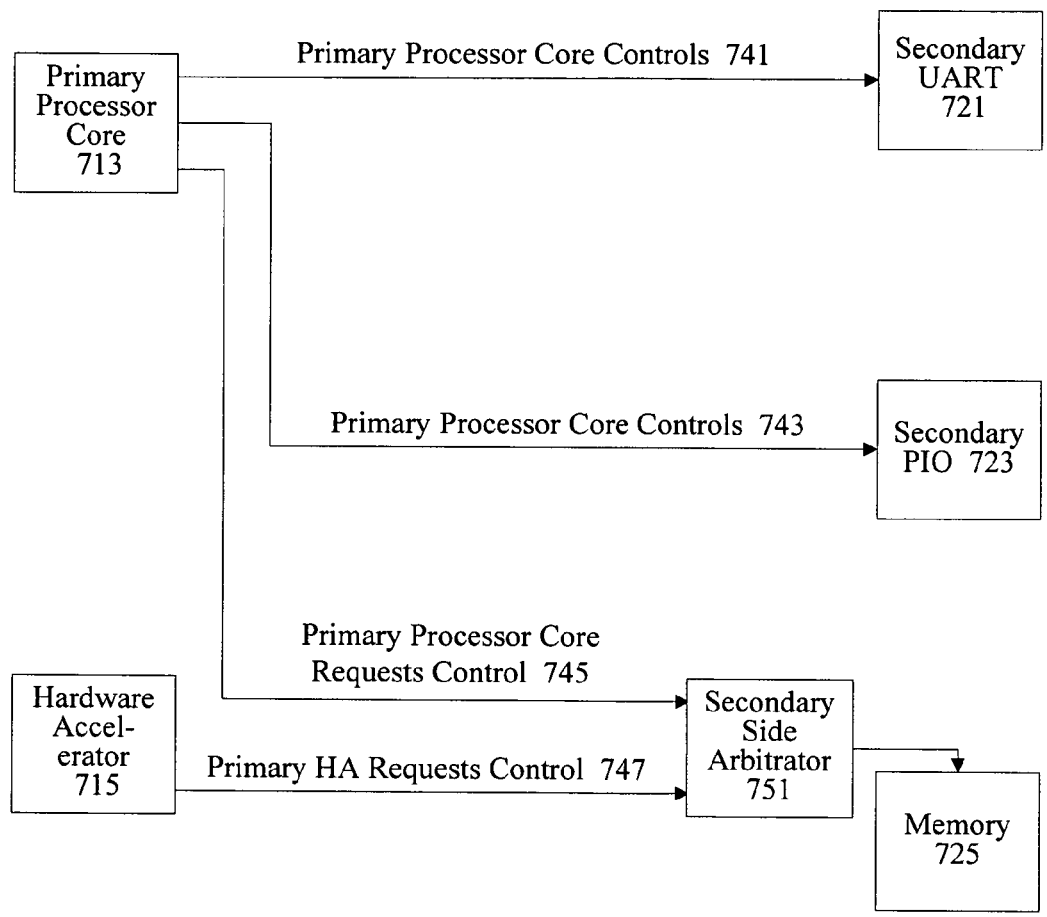
FIG. 7 is a diagrammatic representation showing an interconnection fabric.

FIG. 7 is a diagrammatic representation showing one example of a system using secondary side arbitration, sometimes referred to as slave side arbitration, simultaneous multiple primary components, or simultaneous multiple masters. A system using individual arbitrators that correspond to individual secondary components accessible by more than one primary component is referred to herein as a secondary side arbitration system. The secondary side arbitration system no longer requires a bus or a system bus arbitrator that prevents a second primary component from accessing a second secondary component when a first primary component is accessing a first secondary component. According to various embodiments, a secondary component such as peripheral interface 725 is associated with a secondary side arbitrator 751. However, secondary components UART 721 and PIO 723 are not associated with any arbitrator. In one example, secondary component UART 721 and secondary PIO 723 can only be accessed by primary CPU 713 and not by primary Ethernet device 715. A secondary memory component 725, however, can be accessed by both primary CPU 713 and primary Ethernet device 715.

According to various embodiments, a secondary side arbitrator 751 allows a first secondary component in a system to be accessed by a first primary component at the same time a second secondary component in the system is accessed by a second primary component. For example, peripheral interface 725 can be accessed by primary Ethernet 715 through secondary side arbitrator 751 at the same time, secondary UART 721 is accessed by primary CPU 713.

By allowing a CPU to access a secondary component at the same time another primary component such as a streaming output device or an Ethernet component is accessing memory, bus bottlenecks can be reduced. By using the simultaneous multiple primary component architecture, more direct connections between components can also be supported.

Figure 8:
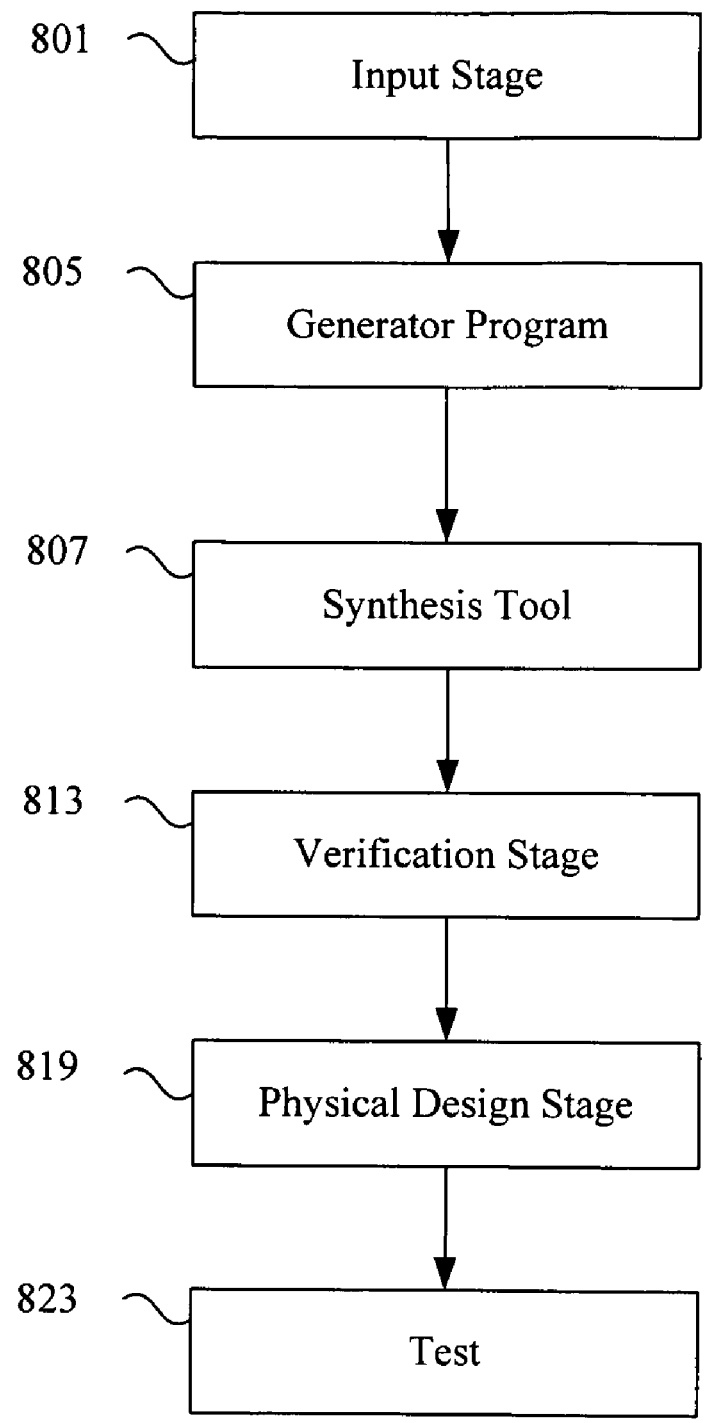
FIG. 8 is a diagrammatic representation showing a technique for implementing the programmable chip.

FIG. 8 is a diagrammatic representation showing implementation of a system on a programmable chip. An input stage 801 receives selection information typically from a user for logic such as a processor core as well as other components such as a streaming output device to be implemented on an electronic device. In one example, the input received is in the form of a high-level language program. A generator program 805 creates a logic description and provides the logic description along with other customized logic to any of a variety of synthesis tools, place and route programs, and logic configuration tools to allow a logic description to be implemented on an electronic device.

In one example, an input stage 801 often allows selection and parameterization of components to be used on an electronic device. The input stage 801 also allows configuration of variable or fixed latency support. In some examples, components provided to an input stage include intellectual property functions, megafunctions, and intellectual property cores. The input stage 801 may be a graphical user interface using wizards for allowing efficient or convenient entry of information. The input stage may also be a text interface or a program reading a data file such as a spreadsheet, database table, or schematic to acquire selection information. The input stage 801 produces an output containing information about the various modules selected.

In typical implementations, the generator program 805 can identify the selections and generate a logic description with information for implementing the various modules. The generator program 805 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 805 identifies pointers and provides ports for each pointer. One tool with generator program capabilities is System on a Programmable Chip (SOPC) Builder available from Altera Corporation of San Jose, Calif. The generator program 805 also provides information to a synthesis tool 807 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool 809.

As will be appreciated by one of skill in the art, the input stage 801, generator program 805, and synthesis tool 807 can be separate programs. The interface between the separate programs can be a database file, a log, or simply messages transmitted between the programs. For example, instead of writing a file to storage, the input stage 801 can send messages directly to the generator program 805 to allow the generator program to create a logic description. Similarly, the generator program can provide information directly to the synthesis tool instead of writing HDL files. Similarly, input stage 801, generator program 805, and synthesis tool 807 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 807.

A synthesis tool 807 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 813 typically follows the synthesis stage 807. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 813, the synthesized netlist file can be provided to physical design tools 819 including place and route and configuration tools. A place and route tool typically locates logic cells on specific logic elements of a target hardware device and connects wires between the inputs and outputs of the various logic elements in accordance with logic required to implement an electronic design. The device can also be physically tested at 823.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 801, the generator program 805, the synthesis tool 807, the verification tools 813, and physical design tools 819 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 9:
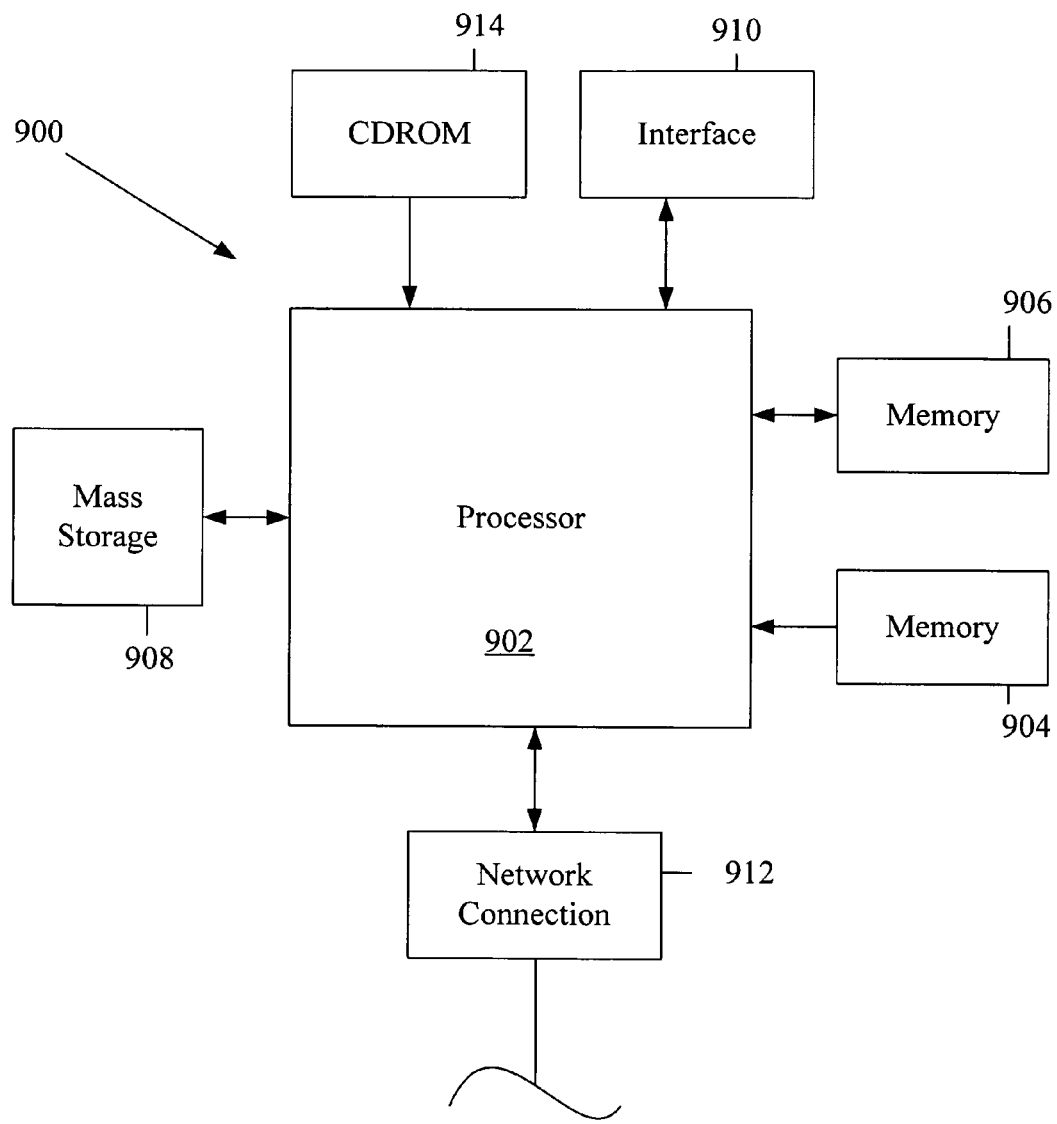
FIG. 9 is a diagrammatic representation depicting a computer system.

FIG. 9 illustrates a typical computer system that can be used to implement a programmable chip having shared I/O lines. The computer system 900 includes any number of processors 902 (also referred to as central processing units, or CPUs) that are coupled to devices including memory 906 (typically a random access memory, or "RAM"), memory 904 (typically a read only memory, or "ROM"). The processors 902 can be configured to generate a test sequences for any designated processor. As is well known in the art, memory 904 acts to transfer data and instructions uni-directionally to the CPU and memory 906 is used typically to transfer data and instructions in a bi-directional manner.

Both of these memory devices may include any suitable type of the computer-readable media described above. A mass storage device 908 is also coupled bi-directionally to CPU 902 and provides additional data storage capacity and may include any of the computer-readable media described above. The mass storage device 908 may be used to store programs, data and the like and is typically a secondary storage medium such as a hard disk that is slower than memory. The mass storage device 908 can be used to hold a library or database of prepackaged logic or intellectual property functions, as well as information on generating particular configurations. It will be appreciated that the information retained within the mass storage device 908, may, in appropriate cases, be incorporated in standard fashion as part of memory 906 as virtual memory. A specific mass storage device such as a CD-ROM 914 may also pass data uni-directionally to the CPU.

CPU 902 is also coupled to an interface 910 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 902 optionally may be coupled to a computer or telecommunications network using a network connection as shown generally at 912. With such a network connection, it is contemplated that the CPU might receive information from the network, or might output information to the network in the course of performing the above-described method steps. It should be noted that the system 900 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 908 or 914 and executed on CPU 908 in conjunction with primary memory 906.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of primary and secondary components and should not be restricted to the ones mentioned above. It is therefore intended that the invention be interpreted to include all variations and equivalents that fall within the true spirit and scope of the present invention.

What is claimed is:

1. A method for performing conditional execution, the method comprising:
providing a semantically overloaded flag operable to hold both semantic information and result information, the flag consisting only of one or two bits operable to hold both semantic information and result information;
receiving an instruction, the instruction included in the instruction set supported by the processor on a programmable chip, the instruction including an operation code and a plurality of operands;
determining if a type associated with the instruction is a comparison type, a saturation type instruction, or neither;
performing the instruction to determine a result;
setting the flag to represent one of following: compare result when the instruction type is a comparison type, saturation result when the instruction type is a saturation type instruction, and a sign of a result when the instruction type is neither;
performing conditional execution using the semantically overloaded flag without using a four-bit NZCV flag.

2. The method of claim 1, wherein the flag is set if the instruction is a comparison instruction and the result of the comparison is true.

3. The method of claim 1, wherein the flag is set if the instruction is a saturating instruction and saturation occurs.

4. The method of claim 1, wherein the flag is set to the sign of the result if the instruction is neither a compare nor a saturating instruction.

5. The method of claim 4, wherein the flag is set based not only on the result but based on the type of instruction.

6. The method of claim 4, wherein a subsequently received instruction uses the flag along with an execution code to determine if the subsequently received instruction should execute.

7. The method of claim 4, wherein an execution code is a two-bit sequence included in the subsequently received instruction.

8. The method of claim 4, wherein an execution code indicates if the subsequently received instruction should execute unconditionally, execute only if the flag is set, or execute only if the flag is not set.

9. The method of claim 1, wherein the instruction is executed on a soft core processor on a programmable chip.

10. The method of claim 1, wherein the flag is a single bit.

11. A device, comprising:
memory;
a processor core coupled to memory, the processor core on a programmable chip configured to receive an instruction having an operation code and a plurality of operands, the instruction included in the instruction set supported by the processor core, determine a type associated with the instruction, and set a semantically overloaded flag consisting only of one or two bits operable to hold both semantic information and result information, the flag set to represent one of following: compare result when the instruction type is a comparison type, saturation result when the instruction type is a saturation type instruction, and a sign of a result when the instruction type is neither, wherein the flag is used to determine whether the processor core will execute a subsequently received instruction without using a four-bit NZCV flag.

12. The method of claim 11, wherein the types of instructions include conditional instructions and saturating instructions.

13. The method of claim 11, wherein the flag is an overloaded flag.

14. The method of claim 11, wherein the flag is set if the instruction is a comparison instruction and the comparison is true.

15. The method of claim 11, wherein the flag is set if the instruction is a saturating instruction and saturation occurs.

16. The method of claim 11, wherein the flag is set to the sign of the result if the instruction is neither a saturating nor a comparison instruction.

17. The method of claim 11, wherein the execution code is a two-bit sequence included in the subsequently received instruction.

18. The method of claim 11, wherein the execution code indicates if the subsequently received instruction should execute unconditionally, execute only if the flag is set, or execute only if the flag is not set.

19. A processor, comprising:
means for providing a semantically overloaded flag operable to hold both semantic information and result information, the flag consisting only of one or two bits operable to hold both semantic information and result information;
means for receiving an instruction, the instruction included in the instruction set supported by the processor, the instruction including an operation code and a plurality of operands;
means for determining if a type associated with the instruction is a comparison type, a saturation type instruction, or neither;
means for setting the flag using the type associated with the instruction and a result from the execution of the operation code on the plurality of operands; and,
means for performing conditional execution using the semantically overloaded flag without using a four-bit NZCV flag,
wherein the flag is set if the instruction has the comparison type and the result of the comparison is true or if the instruction has the saturation type and saturation occurs, wherein the flag is set to the sign of the result if the type is neither.

20. The processor of claim 19, wherein a subsequently received instruction uses the flag along with an execution code to determine if the subsequently received instruction should execute.

21. The processor of claim 19, wherein an execution code is a two-bit sequence included in the subsequently received instruction.

22. The processor of claim 19, wherein an execution code indicates if the subsequently received instruction should execute unconditionally, execute only if the flag is set, or execute only if the flag is not set.

23. The processor of claim 19, wherein the instruction is executed on a soft core processor on a programmable chip.

* * * * *